2,971,959
Patented Feb. 14, 1961

2,971,959

PRODUCTION OF N-BROMINATED ORGANIC NITROGEN COMPOUNDS

Thomas D. Waugh, 3645 Broadway, and Richard C. Waugh, 3915 Broadway, both of Boulder, Colo.

No Drawing. Continuation of applications Ser. Nos. 638,203, 638,207, and 638,209, Feb. 5, 1957. This application Apr. 14, 1958, Ser. No. 728,091

10 Claims. (Cl. 260—309.5)

This invention relates to the production of certain types of N-brominated organic nitrogen compounds, and to a certain novel compound, namely dibromobiuret. This application is a continuation-in-part of our application Serial No. 524,822, filed July 27, 1955, in turn a continuation-in-part of our application Serial No. 487,474, filed February 10, 1955, in turn a continuation-in-part of our application Serial No. 214,019 (now forfeited), filed March 5, 1951. This application is also a continuation of our applications Serial No. 638,203, Serial No. 638,207, and Serial No. 638,209, each filed February 5, 1957. The first two and the last three applications are, also, now abandoned.

More specifically, this application relates to the production of N-brominated compounds from certain types of N-hydrogen organic compounds having a carbonyl group adjacent the nitrogen atom, namely imides of succinic, glutaric and phthalic acids, imides of alkyl and aryl substituted succinic and glutaric acids, monoamides having the formula $RCONH_2$, where R is selected from the group consisting of hydrogen and alkyl, cycloalkyl, carboxyethyl, phenyl, alkylphenyl and phenylalkyl radicals, hydantoin and 5-substituted alkyl, aryl and cycloaliphatic hydantoins, urea, biuret, oxamide, phthalamide and diamides having the formula $H_2NCO(CH_2)_nCONH_2$, where $n$ is 2, 3, or 4. As shown by the examples herein, the above compounds and types of compounds have been treated to produce the N-brominated derivative, but compounds which have been treated without appreciable success in producing the N-brominated derivatives include furoamide, naphthamide, $\alpha$-chloroacetamide, $\alpha,\alpha,\alpha$-trichloroacetamide, barbituric acid, diethylbarbituric acid, uracil, uric acid, alloxan, nicotinamide, allantoin, dicyandiamide, guanidine, parabanic acid, triuret, cyanuric acid, methylurea, acetylmethylurea, saccharin and parabanic acid. Also, malonamide and cyanoacetamide appear to be initially brominated at the alpha carbon.

Procedures previously employed for the production of N-brominated organic nitrogen compounds, by the bromination of N-hydrogen organic compounds, have generally given low yields or impure products or both, as well as products which in many cases exhibited poor chemical stability or poor color stability or both. In addition, previously used processes have proved to be exceedingly wasteful of bromine. In general, N-brominated compounds, as disclosed in the art, have been prepared by the treatment of a corresponding N-hydrogen compound in aqueous medium with molecular bromine in the presence of a strong base, or with alkali hypobromite prepared separately by treatment of molecular bromine with a strong base. In each of the above procedures, only one-half of the bromine used becomes incorporated into the desired N-brominated compound, the other half being converted into a by-product alkali bromide. The N-brominated compound thus obtained is usually contaminated with alkali bromide, unless large quantities of water are employed to dissolve and wash away the equimolecular quantities of alkali bromide formed along with the N-brominated product. Such use of large quantities of water often results in decreased yield of the desired product.

In addition, the process of the present invention has made possible the production of numerous compounds which were never before isolated, such as dibromourea and N-bromoformamide, as well as the commercial production of compounds, such as N-bromoacetamide, which had previously not been available commercially. Also, the present process has made possible the production of compounds which could not be made by the old caustic process. For instance, after the novel compound dibromobiuret had been made by the present process, attempts were made to produce it by the caustic process, but were unsuccessful.

The reaction of bromine with an N-hydrogen organic compound may be considered as represented by the following Equation I, where R is hydrogen or an organic radical and R' is hydrogen or an acyl group and R and R' may be joined in a ring.

(I) 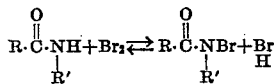

When a strong base is employed, such as NaOH, the base may be looked upon as reacting with HBr to produce NaBr and $H_2O$, for instance. In any event, one-half of the bromine used thus does not produce the desired product, while the alkali bromide produces the disadvantages described above.

Among the objects of this invention are to provide an improved method for the production of N-brominated organic nitrogen compounds from the N-hydrogen organic compounds and types thereof previously enumerated; to provide such a method which is relatively efficient and produces comparatively high yields; to provide such a method which may be carried out with comparative ease; to provide such a method which produces the desired product in a comparatively high state of purity; to provide such a method which may be used to produce commercial quantities of a product which is more stable and has a better color than previous products, if commercially available; to provide such a method which will produce numerous products not previously available commercially; and to provide a certain novel compound namely dibromobiuret. Additional objects and the novel features of this invention will become apparent from the description which follows.

In accordance with the present invention, N-brominated organic nitrogen compounds are produced by the reaction of bromine with the above-enumerated compounds and types of organic N-hydrogen compounds in water by utilizing certain oxidizing agents, particularly bromate ion producing reagents, such as a metallic bromate, and an acid. In certain instances, as in the case of succinimide, the N-hydrogen organic compound is sufficiently acidic that it can function as the acid. By the use of such oxidizing agents, substantially all of the bromine added to the reaction mixture has been utilized in forming the organic N-brominated product with little or no formation of by-product bromides. In acid solution, when a bromate ion reacts with a bromide ion, oxidizing the latter to bromine, the bromate is itself reduced to bromine. Thus, the bromate ion can contribute a portion of the bromine required for the bromination of the organic N-hydrogen compound. The overall reaction involved in the method of the present invention may be represented, using potassium bromate as a representative oxidizing agent, in the following Reaction II, where R and R' are hydrogen or a radical coming within the scope of the previously enumerated compounds or types of compounds, it being noted that R and R' may be joined in a ring, as in the case of the hydantoins:

(II) 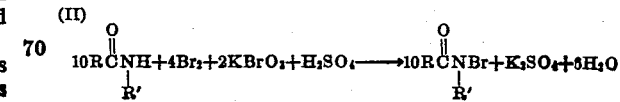

Although sulfuric acid is shown in the above equation, it has been found in practice that, in certain instances, the reaction could be made to proceed without the addition of such acid. Thus, as in Example 5, it was possible to brominate succinimide by the use of bromine and alkali bromate without the addition of acid, although at a considerable sacrifice in yield. With acetamide, on the other hand, no reaction was obtained in the absence of added acid. It is assumed that succinimide, which is mildly acidic, provides a sufficiently acid medium for the reaction to proceed.

Acids which are suitable for use as described in the method of this invention include, but are not limited to, sulfuric acid, nitric acid, phosphoric acid, acetic acid and hydrochloric acid. The reaction appears to proceed much more slowly with acetic acid than with the mineral acids. Also, neither hydrobromic nor hydriodic acid is generally desirable, since hydrobromic acid would introduce the ion which is objectionable, namely, the bromide ion, while hydriodic acid is a powerful reducing agent which would be quickly converted to iodine.

It has further been found that the chloride ion appears to exert a catalytic or promotional effect on the reaction of the method of this invention. Thus, the reaction of bromine and acetamide in the presence of sodium bromate and sulfuric acid to produce N-bromoacetamide proceeded several times as fast when a small proportion of sodium chloride, such as four mol percent, based on bromate, was added as a promoter.

In addition to providing excellent utilization of bromine, the method of the present invention also often provides greatly improved yields and products of superior purity and stability. For example, the best yields of N-bromosuccinimide reported in the literature are of the order of 75–81% of theoretical, while as shown in Example 3, it was possible to obtain a yield of 92.5% of the theoretical by the method of this invention. Furthermore, the product thus obtained in such high yield was snow-white in color and contained 99.6% of the theoretical amount of active bromine, which condition was formerly attained only by recrystallization of an intially colored product. Also, as shown in Example 12, the application of the new process to the preparation of N-bromoacetamide resulted in a decidedly enhanced yield, the yield of product being 76% as compared to yields of about 40–55% reported for earlier processes.

The following table is a comparison of the improved method of this invention with the best results of procedures previously reported for the preparation of two important N-brominated organic compounds, namely, N-bromosuccinimide and N-bromoacetamide.

| Best Previous Procedure | | Present Invention | |
| --- | --- | --- | --- |
| N-BROMOSUCCINIMIDE | | | |
| Materials: | | Materials: | |
| Succinimide | 80 g. | Succinimide | 80 g. |
| NaOH | 32 g. | H₂SO₄ (95%) | 25 g. |
| Bromine | 127.5 g. | NaBrO₃ | 28 g. |
|  |  | NaCl | 1.89 g. |
|  |  | Bromine | 58.5 g. |
| Product: | | Product: | |
| Color | Cream. | Color | White. |
| Yield | 110–115 g. | Yield | 132 g. |
| Analysis | 43.5% Br. | Analysis | 44.7% Br. |
| N-BROMOACETAMIDE | | | |
| Materials: | | Materials: | |
| Acetamide | 47.2 g. | Acetamide | 47.2 g. |
| KOH | 44.8 g. | H₂SO₄ (95%) | 25 g. |
| Bromine | 128.0 g. | NaBrO₃ | 25 g. |
|  |  | NaCl | 1.87 g. |
|  |  | Bromine | 49.5 g. |
| Product: | | Product: | |
| Reported Yield | 44–61 g. | Yield | 84 g. |
|  |  | Analysis | 58.0% Br. |

Advantages of the method of this invention are readily apparent from a brief examination of the above table. In the case of N-bromosuccinimide, the new method afforded a 15–19% increase in yield, a higher percentage of active bromine in the product, and a product greatly superior in color, i.e., snow-white. For certain industrial applications of N-bromosuccinimide, both purity and color are of primary importance, and it was formerly necessary to resort to expensive recrystallization of the crude product in order to produce a product which had a sufficiently high active bromine content and light color for certain applications. Such recrystallization of N-bromosuccinimide is a highly uneconomical operation, for the reason that it is impossible to avoid a certain amount of decomposition and loss of the compound in carrying out the recrystallization, which is also time consuming. In addition, the high active bromine content shown has far more easily and consistently been attained by the method of this invention than by the methods formerly known in the art.

In the case of N-bromoacetamide, the yield was decidedly superior and the operability of the process was greatly improved by this invention. The previous processes for the production of N-bromoacetamide were, in fact, so ineffective that, as far as is known, this compound has never been commercially available prior to the present invention.

The products of this invention in many cases exhibit better stability, as color or chemical stability, than those produced by the prior process. The N-bromosuccinimide produced by the method of the present invention has been found to remain color stable during storage for five years, while that from the caustic process previously known to the art, discolored badly in a few months' time, generally less than one year. Other products, such as N-bromoformamide, were so chemically unstable when prepared by the old process that they could not even be isolated from the reaction mixture and analyzed. Also, there has been no reported isolation of dibromourea, but only the hypothesis that it existed in solution; whereas with the present method, dibromourea has been produced which was sufficiently stable for isolation and analysis. While N-brominated derivatives of diamides have been made in the laboratory by the use of liquid bromine and Na₂CO₃ or NaHCO₃, this prior process requires exhaustive washing and is not commercially desirable. As indicated previously, attempts to produce the novel compound dibromobiuret by the caustic process have failed.

The novel compound of this invention, namely dibromobiuret, has use as an oxidizing agent, as a brominating agent, and as a reagent or intermediate for the preparation of other compounds. Dibromobiuret has a higher proportion of active bromine than any hitherto commercially available organic compound and has an unexpected uniquely greater range of reactivity as a brominating agent than any of the commercially available N-bromo organic compounds. Dibromobiuret further increases the range of selection of oxidizing agents, brominating agents and intermediates for use wherein the previously available compounds may not be completely suitable for the purpose intended.

The following examples will serve to illustrate specific applications of the method of this invention, but are not to be construed as limiting the same.

*Example 1*

(USE OF NaBrO₃ AND H₂SO₄ IN THE PRODUCTION OF N-BROMOSUCCINIMIDE)

In a beaker equipped with a mechanical stirrer, 80 g. (0.808 mole) of succinimide, analyzing 99.5% pure, and 14 cc. (0.237 mole) of concentrated sulfuric acid were dissolved in 275 cc. of water at 35° C. To the solution was added 15 g. (0.107 mole) of bromine. The solution immediately assumed a dark red-orange color and remained essentially unchanged upon stirring for thirty minutes. At the end of the period no solid precipitate was visible in the solution. Apparently no reaction had taken place between bromine and succinimide under these conditions. To this same mixture was now added a solution of 5 g. (0.033 mole) of sodium bromate in 25 cc. of water at 35° C. The color of the solution began to fade immediately, indicating that bromine was being used up, and after five minutes a white solid had precipitated from the solution. The solid was filtered, washed thoroughly with water, dried and analyzed for active bromine content by iodimetric titration. It was found to contain 44.7% active bromine and was identical with an authentic sample of N-bromosuccinimide.

*Example 2*

(USE OF KBrO₃ AND H₂SO₄ IN THE PRODUCTION OF N-BROMOSUCCINIMIDE)

In a beaker equipped with a mechanical stirrer, 80 g. (0.808 mole) of succinimide, analyzing 99.5% pure, was dissolved in 275 cc. of water at 35° C. To the solution was added 31 g. (0.185 mole) of KBrO₃ and 14 cc. (0.237 mole) of concentrated sulfuric acid. The mixture was held at approximately 30° C. in a water bath while 57 g. (0.357 mole) of bromine was added dropwise at a rate such that the color never became darker than a light yellow-orange. A white precipitate soon appeared and the mixture gradually became quite thick. The bromine addition required 110 minutes, and after all of the bromine had been added, the mixture was stirred for an additional 15 to 20 minutes. The heavy slurry was filtered, washed well with water, and dried in an oven at 40–50° C. The product was a snow-white crystalline powder weighing 125 g., the yield being 87.5% of theoretical, based on succinimide. Analysis by iodimetric titration showed 44.7% active bromine, as compared with the theoretical value for N-bromosuccinimide of 44.89%.

*Example 3*

(USE OF KBrO₃, H₂SO₄ AND NaCl IN THE PRODUCTION OF N-BROMOSUCCINIMIDE)

To 0.808 mole of succinimide, 0.25 mole of H₂SO₄ and 0.185 mole of KBrO₃ dissolved in 275 cc. of water at 35° C., was added 0.032 mole (4.0 mole percent based on succinimide) of NaCl in 8 cc. of water, then 0.357 mole of bromine was added gradually. The reaction was carried out substantially as in Example 2, except that it was possible to add all of the bromine in 30 minutes. The yield of dry, snow-white powder amounted to 132 g. (92.5% of theoretical based on succinimide) and analyzed 44.6% active bromine.

*Example 4*

(USE OF NaBrO₃, H₂SO₄ AND NaCl IN THE PRODUCTION OF N-BROMOSUCCINIMIDE)

The procedure used in Example 3 was repeated, with the exception that 28 g. (0.185 mole) of NaBrO₃ was substituted for 0.185 mole of KBrO₃. Identical results were obtained. Thus, the product weighed 132 g., or 92.5% of theoretical, and analyzed 44.7% active bromine.

*Example 5*

(USE OF NaBrO₃ WITHOUT ADDED ACID IN THE PRODUCTION OF N-BROMOSUCCINIMIDE)

To a solution of 0.808 mole of succinimide and 0.162 mole of NaBrO₃ in 275 cc. of water was added dropwise 0.33 mole of bromine at a temperature of 20–27° C. Reaction commenced immediately but proceeded rather slowly. After about one-third of the bromine had been introduced, 0.017 mole of NaCl was added as a promoter. The bromine addition was completed and the white precipitate of N-bromosuccinimide was filtered off. After washing and drying, the white powder obtained was identified as N-bromosuccinimide and weighed 60 g., amounting to 42% of the theoretical yield. The filtrate was then acidified with H₂SO₄ and a further quantity of N-bromosuccinimide precipitated immediately. After filtering, washing and drying, the additional product weighed 25 g., or 17% of the theoretical yield. Thus, the total yield was 59% of theoretical.

*Example 6*

(USE OF NaBrO₃ AND H₂SO₄ IN THE PRODUCTION OF N-BROMOGLUTARIMIDE)

To a mixture of 5.6 g. (0.05 mole glutarimide, 3 g. (0.02 mole) of sodium bromate, 2.5 ml. (0.05 mole) of concentrated sulfuric acid, and 50 ml. of water, was added dropwise 2 ml. (0.04 mole) of bromine. The mixture was cooled to 10° C. and filtered. The product was washed with cold water and dried at room temperature. The nearly colorless N-bromoglutarimide weighed 4.8 g. (50% of the theoretical amount) and contained 41.2% active bromine. The formula $C_5H_6O_2NBr$ calls for 41.6% active bromine.

*Example 7*

(USE OF NaBrO₃, H₂SO₄ AND CH₃OOH IN THE PRODUCTION OF N-BROMOPHTHALIMIDE)

To a mixture of 14.7 g. (0.1 mole) of phthalimide, 6.0 g. (0.04 mole) of sodium bromate, 6.5 ml. (0.13 mole) of concentrated sulfuric acid, 2 ml. (0.03 mole) of glacial acetic acid and 120 ml. of water at 35–40° C., was added dropwise 4.5 ml. (0.09 mole) of bromine during 1.5 hours. The product was filtered off, washed with water and dried at room temperature. This procedure produced 20.4 g. (91% of the theoretical amount) of N-bromophthalimide which contained 33.2% active bromine compared with 35.3% active bromine required by the formula $C_8H_4O_2NBr$.

*Example 8*

(USE OF NaBrO₃, H₂SO₄ AND CH₃COOH IN THE PRODUCTION OF N-BROMO-β-METHYLGLUTARIMIDE)

To a mixture of 22 g. (0.2 mole) of β-methylglutarimide, 6.6 g. (0.044 mole) of sodium bromate, 3.0 ml. (0.05 mole) of concentrated sulfuric acid, 1.5 ml. (0.025 mole) of glacial acetic acid, and 300 ml. of water at 25° C., was added 4 ml. (0.075 mole) of bromine during 75 minutes. The mixture was stirred for one hour, filtered, washed with ice water, and dried at room temperature. The product, identified as N-bromo-β-methylglutarimide, weighed 17 g. (42% of the theoretical amount) and contained 38.5% active bromine, compared with the 38.8% required by the formula $C_6H_8BrNO_2$. It melted at 125–127° C.

*Example 9*

(USE OF NaBrO₃, H₂SO₄ AND CH₃COOH IN THE PRODUCTION OF N-BROMO-α-PHENYLSUCCINIMIDE)

To 1.6 g. (0.01 mole) of α-phenylsuccinimide and 30 ml. of water were added 0.33 g. (0.002 mole) of sodium bromate, 0.08 ml. (0.001 mole) of glacial acetic acid, 0.15 ml. (0.003 mole) of concentrated sulfuric acid. The temperature was maintained at 30–35° C., and bromine (0.2 ml., 0.004 mole) was added. The mixture was stirred for an additional 2½ hours. It was then cooled to 5° C., filtered, washed with ice water and dried at room temperature. The product, identified as N-bromophenylsuccinimide, weighed 2.1 g. (84% of the theoretical amount) and contained 29.5% active bromine compared with the 31.4% required by the formula $C_{10}H_8BrNO_2$. It melted at 105–107° C.

*Example 10*

(USE OF NaBrO₃, H₂SO₄ AND CH₃COOH IN THE PRODUCTION OF N-BROMO-α-METHYLSUCCINIMIDE)

To a solution of 11.3 g. (0.1 mole) of α-methylsuccinimide, 3.3 g. (0.022 mole) of sodium bromate, 1.5 ml. (0.031 mole) of concentrated sulfuric acid, 0.8 ml. (0.014 mole) of glacial acetic acid, and 100 ml. of water at 45° C., was added 2 ml. (0.039 mole) of bromine during 15 minutes. After stirring for one hour, the mixture was cooled to 10° C. and filtered. The filter cake was washed with ice water and dried at room temperature. The product, identified as N-bromo-α-methylsuccinimide, weighed 10 g. (53% of the theoretical amount) and contained 41.7% active bromine compared with the 41.6% required by the formula $C_5H_6BrNO_2$. It melted at 70–72° C.

*Example 11*

(USE OF NaBrO₃ AND H₂SO₄ IN THE PRODUCTION OF N-BROMOFORMAMIDE)

A solution of 6 g. (0.04 mole) of sodium bromate, 5 ml. concentrated sulfuric acid (0.1 mole), 9 g. (0.2 mole) of formamide, and a trace of sodium chloride in 40 ml. of water was cooled in an ice bath while 4 ml. (0.08 mole) of bromine was added dropwise with stirring. After half the bromine had been added, a crystal or two of N-bromoacetamide was added. When all of the bromine had been added, crystallization of N-bromoformamide started. The mixture was cooled to −5° C. and filtered. The nearly colorless crystals of N-bromoformamide were washed with 25 ml. of ice water and dried in air at room temperature. In this way was obtained 7.4 g. (29% of the theoretical amount) of N-bromoformamide which contained 64.5% active bromine, the theoretical amount required for the compound HCONHBr.

*Example 12*

(USE OF NaBrO₃ AND H₂SO₄ IN THE PRODUCTION OF N-BROMOACETAMIDE)

To a solution of 47.2 g. (0.8 mole) of acetamide in 140 cc. of water was added 25 g. (0.16 mole) of NaBrO₃ and 13.6 cc. (0.25 mole) of H₂SO₄. The mixture was cooled to 10° C., and 52.5 g. (0.328 mole) of bromine was added dropwise at such a rate as to avoid excessive bromine fumes above the liquid, holding a temperature of 10–25° C. The solution soon became dark red-orange in color, but no precipitate appeared until about half the bromine had been added. Crystallization took place suddenly when about one-half the bromine had been added, and the mixture was converted to a heavy mush. The remainder of the bromine was added dropwise with agitation, some 45 minutes being required for the entire addition. The mixture was stirred for an additional 15 minutes while being cooled to 6° C., and the crystals were then filtered, washed with water and dried. The product was a white powder weighing 75 g., amounting to 67% of the theoretical yield. Analysis showed 58.0% active bromine, as compared with the theoretical value for N-bromoacetamide of 57.92%.

*Example 13*

(USE OF NaBrO₃, H₂SO₄ AND NaCl IN THE PRODUCTION OF N-BROMOACETAMIDE)

The procedure of Example 12 was repeated, except that only 49.5 g. (0.31 mole) of bromine was used and 4.0 mole percent NaCl, based on acetamide, was added. The addition of bromine was completed in 19 minutes, and the yield of product containing 58.0% active bromine amounted to 76% of the theoretical.

*Example 14*

(USE OF NaBrO₃, H₂SO₄ AND NaCl IN THE PRODUCTION OF N-BROMOPROPIONAMIDE)

A solution containing 12.2 g. (0.17 mole) of propionamide, 5.0 g. (0.033 mole) of sodium bromate, 4 ml. (0.08 mole) of concentrated sulfuric acid, and 0.2 g. (0.003 mole) of sodium chloride in 50 ml. of water was cooled to 15° C. with an ice bath while 3.0 ml. (0.06 mole) of bromine was added. An orange-colored liquid layer separated. When this was seeded with a few crystals of N-bromoacetamide, crystals of N-bromopropionamide separated. The product was separated by filtration and washed with cold water. After drying in the air at room temperature, 10.5 g. (41% of the theoretical amount) of colorless N-bromopropionamide was obtained. It melted at 71–75° C., and contained 51.2% active bromine compared with 52.8% active bromine required by the formula $CH_3CH_2CONHBr$.

*Example 15*

(USE OF NaBrO₃ AND H₂SO₄ IN THE PRODUCTION OF N-BROMOBUTYRAMIDE)

To a mixture of 4.4 g. (0.05 mole) of n-butyramide, 1.5 g. (0.01 mole) of sodium bromate, 1.2 ml. (0.024 mole) of concentrated sulfuric acid, and 15 ml. of water at 5–15° C., was added 1.1 ml. (0.02 mole) of bromine during 1.25 hour. The reddish oil which separated was drawn off and washed with ice water. After drying with anhydrous magnesium sulfate, the oil crystallized. The crystalline N-bromobutyramide contained 46.5% active bromine, compared with the 48.1% required by the formula $C_4H_8ONBr$, and melted at 35–41° C., with decomposition.

*Example 16*

(USE OF NaBrO₃, H₂SO₄ AND NaCl IN THE PRODUCTION OF N-BROMOVALERAMIDE)

To a mixture of 5.0 g. (0.05 mole) of n-valeramide, 1.5 g. (0.01 mole) of sodium bromate, 1.2 ml. (0.024 mole) of concentrated sulfuric acid, a trace of sodium chloride, and 50 ml. of water at 12° C., was added 1.1 ml. (0.02 mole) of bromine during 0.5 hour. The valeramide disappeared and a reddish oil appeared. The mixture was stirred for an additional hour and the heavy organic layer was drawn off and washed with water. The oily layer weighed 2.5 g. (28% of the theoretical amount) and contained 40.0% active bromine compared with 44.4% required by the formula $C_5H_{10}ONBr$. After it was dried with anhydrous magnesium sulfate, the oil crystallized. The crystalline N-bromovaleramide contained 42.3% active bromine and melted at 14–16° C.

*Example 17*

(USE OF NaBrO₃ AND H₂SO₄ IN THE PRODUCTION OF N-BROMOBENZAMIDE)

To a mixture of 12 g. (0.1 mole) of benzamide, 3 g. (0.02 mole) of sodium bromate, 3 ml. (0.06 mole) of concentrated sulfuric acid and 100 ml. of water at 43–50° C., was added 2.5 ml. (0.05 mole) of bromine during one hour. The mixture was stirred for an additional hour, cooled to 10° C., and filtered. The product was washed well with water and dried at room temperature. The N-bromobenzamide produced by this procedure weighed 18.6 g. (93% of the theoretical amount) and contained 39.3% active bromine compared with the 39.9% required by the formula $C_7H_6ONBr$.

*Example 18*

(USE OF NaBrO₃ AND H₂SO₄ IN THE PRODUCTION OF N-BROMOTOLUAMIDE)

To a mixture of 3.4 g. (0.025) mole) of o-toluamide, 0.75 g. (0.005 mole) of sodium bromate, 0.6 ml. (0.012 mole) of concentrated sulfuric acid, and 25 ml. of water at 40° C., was added 0.6 ml. (0.01 mole) of bromine during 0.5 hour. The mixture was stirred for an additional half hour, cooled to 10° C., and filtered. The product was washed with water and dried at room temperature. The N-bromotoluamide produced by this procedure weighed 3.6 g. (67% of the theoretical amount), contained 33.1% active bromine, compared with the 37.3% required by the formula $C_8H_8ONBr$, and melted at 72–80° C. with decomposition.

*Example 19*

(USE OF NaBrO₃ AND H₂SO₄ IN THE PRODUCTION OF N-BROMOPHENYLACETAMIDE)

To a mixture of 6.8 g. (0.05 mole) of phenylacetamide, 1.5 g. (0.01 mole) of sodium bromate, 1.2 ml. (0.024 mole) of concentrated sulfuric acid, and 50 ml. of water at 25–30° C., was added 1.1 ml. (0.02 mole)

of bromine during 0.5 hour. The mixture was stirred for an additional 0.5 hour, cooled to 10° C., and filtered. The product was washed with water and dried at room temperature. The N-bromophenylacetamide produced by this procedure weighed 8.0 g. (75% of the theoretical amount) and contained 30.9% active bromine compared with the 37.3% required by the formula $C_8H_8ONBr$. A purer product could probably have been obtained by the use of more finely divided phenylacetamide.

*Example 20*

(USE OF $NaBrO_3$, $H_2SO_4$ AND $CH_3COOH$ IN THE PRODUCTION OF N-BROMOCYCLOPENTYLPROPIONAMIDE)

To a mixture of 29 g. (0.22 mole) of cyclopentylpropionamide, 6.6 g. (0.044 mole) of sodium bromate, 3.0 ml. (0.05 mole) of concentrated sulfuric acid, 1.5 ml. (0.025 mole) of glacial acetic acid, and 150 ml. of water at 18° C., was added 4 ml. (0.075 mole) of bromine during 30 minutes. The mixture was cooled gradually to less than 10° C. and stirred for 2 hours. The product was filtered, washed with ice water, dried at room temperature, and identified as N-bromocyclopentylpropionamide. It weighed 31 g. (71% of the theoretical amount), contained 35.1% active bromine compared with the 36.5% required by the formula $C_8H_{14}BrNO$, and melted at 66°–68° C.

*Example 21*

(USE OF $NaBrO_3$, $H_2SO_4$, AND $CH_3COOH$ IN THE PRODUCTION OF N,N'-DIBROMOOXAMIDE)

To a mixture of 17.6 g. (0.2 mole) of oxamide, 12.0 g. (0.08 mole) of sodium bromate, 13 ml. (0.26 mole) of concentrated sulfuric acid, 4 ml. (0.07 mole) of glacial acetic acid, and 250 ml. of water at 45–50° C., was added 9.0 ml. (0.17 mole) of bromine during 1.5 hours. After 0.5 hour further stirring the solid material was filtered off, washed well with cold water, dried at room temperature and identified as N,N'-dibromooxamide. It weighed 38 g. (77% of the theoretical amount) and contained 63.8% active bromine compared with 65.0% active bromine required by the formula $C_2H_2O_2N_2Br_2$. In an attempt to obtain the melting point, the compound was still unmelted at 250° C.

*Example 22*

(USE OF $NaBrO_3$ AND $H_2SO_4$ IN THE PRODUCTION OF N,N'-DIBROMOSUCCINDIAMIDE)

To a mixture of 11.6 g. (0.1 mole) of succindiamide, 6.0 g. (0.04 mole) of sodium bromate, 5 ml. (0.1 mole) of concentrated sulfuric acid, and 85 ml. of water at 30–35° C., was added 5 ml. (0.1 mole) of bromine during 40 minutes. The mixture was then stirred for an additional hour, cooled to 10° C., and filtered. The product was washed well with cold water, dried at room temperature and identified as N,N'-dibromosuccindiamide. It weighed 22.3 g. (81.5% of the theoretical amount) and contained 57.5% active bromine compared with 58.3% active bromine required by the formula $C_4H_6O_2N_2Br_2$.

*Example 23*

(USE OF $NaBrO_3$, $H_2SO_4$ AND $CH_3COOH$ IN THE PRODUCTION OF N,N'-DIBROMOADIPAMIDE)

To a mixture of 4.2 g. (0.03 mole) of adipamide, 1.8 g. (0.01 mole) of sodium bromate, 2 ml. (0.04 mole) of concentrated sulfuric acid, 0.5 ml. (0.008 mole) of glacial acetic acid, and 80 ml. of water at 35° C., was added 1.5 ml. (0.03 mole) of bromine during 20 minutes. After stirring for an additional 0.5 hour, the mixture was cooled to 20° C. The product was filtered off, washed with cold water, dried at room temperature, and identified as N,N'-dibromoadipamide. It weighed 6.0 g. (67% of the theoretical amount) and contained 51.3% active bromine compared with 53.1% active bromine required by the formula $C_6H_{10}O_2N_2Br_2$.

*Example 24*

(USE OF $NaBrO_3$ AND $H_2SO_4$ IN THE PRODUCTION OF N,N'-DIBROMOTEREPHTHALAMIDE)

To a mixture of 8.2 g. (0.05 mole) of terephthalamide, 3.0 g. (0.02 mole) sodium bromate, 2 ml. (0.04 mole) concentrated sulfuric acid, and 75 ml. of water at 30–40° C., was added 2.2 ml. (0.04 mole) of bromine during 1 hour. The mixture was stirred an additional 10 minutes and filtered. The product was washed well with water, dried at room temperature, and identified as N,N'-dibromoterephthalamide. It weighed 14.5 g. (88% of the theoretical amount), contained 41.2% active bromine compared with 49.6% required by the formula $C_8H_6O_2N_2Br_2$, and decomposed at 212° C. The product obtained corresponds to only an 83% pure product, which is not surprising when it is realized that terephthalamide is extremely insoluble, as is the terephthalic acid from which the amide was made. This makes it difficult to remove these probable impurities from the N-bromo compound.

*Example 25*

(USE OF $NaBrO_3$, $H_2SO_4$ AND $CH_3COOH$ IN THE PRODUCTION OF THE N-BROMOMONOAMIDE OF SUCCINIC ACID)

To a mixture of 40 g. (0.34 mole) of the monoamide of succinic acid, 12.6 g. (0.08 mole) of sodium bromate, 5.6 ml. (0.1 mole) of concentrated sulfuric acid, 2.8 ml. (0.05 mole) of glacial acetic acid, and 70 ml. of water at 26° C., was added 7.4 ml. (0.14 mole) of bromine during 35 minutes. The mixture was stirred for an additional 10 minutes, cooled to 10° C., and filtered. The product was washed with ice water, dried at room temperature and identified as the N-bromomonoamide of succinic acid. It weighed 38 g. (56% of the theoretical amount), contained 40.4% active bromine compared with 40.7% required by the formula $C_4H_6BrNO_3$, and melted with decomposition at 99–102° C.

*Example 26*

(USE OF $NaBrO_3$, $H_2SO_4$ AND NaCl IN THE PRODUCTION OF N,N'-DIBROMOUREA)

In a solution of 6.0 g. (0.1 mole) of urea, 6.0 g. (0.04 mole) of sodium bromate, 5 ml. (0.1 mole) of concentrated sulfuric acid, a trace of sodium chloride and 40 ml of water, was added 4 ml. (0.08 mole) of bromine under mild cooling. After about an hour, a small amount of solid precipitate formed. The precipitate was collected by filtration, washed with a little cold water and dried at room temperature. The N,N-dibromourea product weighed 1.6 g. (7.3% of the theoretical amount), contained 72.4% active bromine, compared with 73.3% active bromine required by the formula $C_3H_2ON_2Br_2$, and decomposed vigorously at 66° C.

*Example 27*

(USE OF $NaBrO_3$, $H_2SO_4$ AND $CH_3COOH$ IN THE PRODUCTION OF DIBROMOBIURET)

To a mixture of 5.0 g. (0.049 mole) of biuret, 3.0 g. (0.025 mole) of sodium bromate, 2.2 ml. (0.04 mole) of concentrated sulfuric acid, 1 ml. (0.002 mole) of glacial acetic acid, and 25 ml. of water at 25° C., was added 2.0 ml. (0.04 mole) of bromine during 1 hour. The mixture was stirred for 40 minutes and filtered. The buff-colored solid obtained by filtration was washed with water and dried at room temperature. The dibromobiuret produced by this procedure weighed 6.7 g. (52.5% of the theoretical amount) and contained 60.4% active bromine compared with 61.3% required by the formula $C_2H_3O_2N_3Br_2$. In an attempt to obtain the melting point, the compound decomposed vigorously when it was heated to 163° C.

Example 28

(USE OF NaBrO₃ AND H₂SO₄ IN THE PRODUCTION OF 1,3-DIBROMOHYDANTOIN)

To a mixture of 1.0 g. (0.01 mole) of hydantoin, 0.6 g. (0.004 mole) of sodium bromate, 0.5 ml. (0.01 mole) of concentrated sulfuric acid, and 20 ml. of hot water, was added 0.5 ml. (0.01 mole) of bromine. To induce crystallization, the slightest trace of powdered 1,3-dibromo-5,5-dimethylhydantoin was introduced. Crystallization was immediate. The crystals were filtered off, washed with water and dried at room temperature. The 1,3 - dibromohydantoin produced by this procedure weighed 1.65 g. (64% of the theoretical amount) and contained 58.1% active bromine compared with 62.0% active bromine required by the formula $C_3H_2O_2N_2Br_2$. Recrystallization of the above material from 2 N nitric acid produced a nearly colorless product containing 60.4% active bromine, which melted at 125–130° C., with decomposition.

Example 29

(USE OF NaBrO₃ AND H₂SO₄ IN THE PRODUCTION OF 1,3-DIBROMO-5,5-DIMETHYLHYDANTOIN)

To 0.4 mole of 5,5-dimethylhydantoin, 0.23 mole of H₂SO₄, 0.18 mole of NaBrO₃, and 0.032 mole of NaCl, dissolved in 400 cc. of H₂O at 35–40° C., was added dropwise 0.32 mole of bromine over a period of 52 minutes. The mixture was then stirred for 20 minutes and filtered; the cake was then washed with water and dried. Iodimetric titration showed the product to be 1,3-dibromo-5,5-dimethylhydantoin.

Example 30

(USE OF NaBrO₃, H₂SO₄ AND CH₃COOH IN THE PRODUCTION OF 1,3 - DIBROMO - 5 - METHYL-5-ETHYLHYDANTOIN)

To a mixture of 28.5 g. (0.2 mole) of methylethylhydantoin, 14.4 g. (0.095 mole) of sodium bromate, 6.4 ml. (0.115 mole) of concentrated sulfuric acid, 3.2 ml. (0.056 mole) of glacial acetic acid, and 160 ml. of water at 46° C., was added 8.8 ml. (0.17 mole) of bromine during 1.5 hours. The mixture was stirred for an additional hour at 45° C., cooled to 5° C., and filtered. The product was washed with ice water, and dried at 60° C. The product, identified as dibromomethylethylhydantoin, weighed 52 g. (87% of the theoretical amount) and contained 49.5% active bromine compared with the 53.3% required for the formula $C_6H_8O_2N_2Br_2$. It melted at 110–112° C.

Example 31

(USE OF NaBrO₃, H₂SO₄ AND CH₃COOH IN THE PRODUCTION OF 1,3-DIBROMO-5-METHYL-5-ISOBUTYLHYDANTOIN)

To a mixture of 34 g. (0.2 mole) of methylisobutylhydantoin, 14.4 g. (0.095 mole) of sodium bromate, 6.4 ml. (0.115 mole) of concentrated sulfuric acid, 3.2 ml. (0.056 mole) of glacial acetic acid, and 160 ml. of water at 49° C., was added 8.8 ml. (0.17 mole) of bromine during 1 hour. The mixture was stirred for an additional 20 minutes, cooled to 5° C., and filtered. The product was washed with ice water and dried at 60° C. The product, identified as dibromomethylisobutylhydantoin, weighed 64 g. (97.5% of the theoretical amount), and contained 47.2% active bromine compared with the 48.6% required for the formula $C_8H_{12}O_2N_2Br_2$. It melted at 145–149° C.

Example 32

(USE OF NaBrO₃, H₂SO₄ AND CH₃COOH IN THE PRODUCTION OF 1,3-DIBROMO-5,5-DIPHENYLHYDANTOIN)

To a mixture of 7 g. (0.046 mole) of sodium bromate, 2 ml. (0.033 mole) of glacial acetic acid, 3.2 ml. (0.055 mole) of concentrated sulfuric acid and 350 ml. of water was added 25 g. (0.1 mole) of 5,5-diphenylhydantoin. The slurry was warmed to 45° C., and then bromine (4.4 ml., 0.083 mole) was added during 2 hours. The mixture was heated at 44–47° C. for 3 hours additional and then cooled to 30° C. The product was filtered, washed with water, dried at 60° C., and identified as 1,3-dibromo-5,5-diphenylhydantoin. It weighed 32 g. (78% of the theoretical amount) and contained 36.8% active bromine compared with the 39.0% required by the formula $C_{15}H_{10}Br_2N_2O_2$. It melted at 200–205° C. with decomposition.

Example 33

(USE OF NaBrO₃, H₂SO₄ AND CH₃COOH IN THE PRODUCTION OF 1,3-DIBROMO-5,5-PENTAMETHYLENESPIROHYDANTOIN)

To 6.6 g. (0.044 mole) of sodium bromate and 250 ml. of water was added 17 g. (0.1 mole) of pentamethylenespirohydantoin, 1.5 ml. (0.025 mole) of glacial acetic acid and 3.0 ml. (0.06 mole) of concentrated sulfuric acid. The mixture was heated to 55° C. and bromine (4.0 mol., 0.078 mole) was then added during 45 minutes; stirring was continued for an additional 45 minutes. The mixture was cooled to 5° C., filtered, washed with ice water and dried at 60° C. The product, identified as 1,3-dibromo-5,5-pentamethylenespirohydantoin, weighed 29 g. (88% of the theoretical amount) and contained 47.3% active bromine compared with the 48.9% required by the formula $C_8H_{10}Br_2N_2O_2$. It melted at 172–173° C., with decomposition.

Example 34

(USE OF NaBrO₃, H₂SO₄ AND CH₃COOH IN THE PRODUCTION OF MONOBROMO-5,5-DIMETHYLHYDANTOIN)

To a solution of 204 g. (1.6 moles) of 5,5-dimethylhydantoin, 53.2 g. (0.35 mole) of sodium bromate, 24 ml. (0.43 mole) of concentrated H₂SO₄, 12 ml. (0.21 mole) of glacial acetic acid, 1.2 g. (0.02 mole) of NaCl and 1600 ml. of water at 40°, was added 31.6 ml. (0.62 mole) of bromine during 2 hours. The mixture was stirred for 15 minutes, then cooled to 7° C. and filtered. The filter cake was washed with ice water and dried at 60° C. The product, identified as monobromo-5,5-dimethylhydantoin, weighed 278 g. (84% of the theoretical amount) and contained 38.2% active bromine, compared with the 38.6% required by the formula

This compound has been designated in the literature as 3-bromo-5,5-dimethylhydantoin, but there is evidence to indicate that it is actually 1-bromo-5,5-dimethylhydantoin; therefore, this compound is designated here simply as monobromo-5,5-dimethylhydantoin.

In the foregoing examples, it will be noted that in some examples the bromine is added to a solution of the N-hydrogen organic compound, water, oxidizing agent and other constituents, while in other examples the bromine is added to a mixture of the N-hydrogen compound, water, oxidizing agent and other constituents. The latter indicates that the N-hydrogen compound is sparingly soluble in water. Nevertheless, it was found that with stirring and particularly when the N-hydrogen compound was added in relatively finely divided form, the various reactions proceeded as indicated, despite the low solubility of the N-hydrogen compound in water. It will be noted, of course, that reagents such as NaBrO₃, KBrO₃ and other bromates, H₂SO₄ and other acids, NaCl and other chlorides are normally soluble in water, so that such reagents would normally be in aqueous solution.

In addition to the specific conditions described above, the invention may in many instances be carried out at other temperatures, such as from the freezing point of the solution to near the boiling point of water. In general, the less stable N-brominated compounds should be made at temperatures lying toward the lower end of the range. For example, it is preferred to carry out the reaction at from 0° C. to 65° C., in the production of N-bromosuccinimide and at 0° C. to 35° C., in the production of N-bromoacetamide.

Reactants of lower purity than those used in the examples may, of course, be employed, although they may cause certain problems in purification of the final product to be involved. In general, higher or lower concentrations of acids or oxidizing agents, or mixtures of two or more, may be used, but it is generally preferred to use from 0 to 15% more than the theoretical amount of the latter. The chloride ion promoter may be varied generally at will, depending upon the reaction rate desired, although excessive quantities may have an adverse effect on the purity of the final product.

The compounds produced by the method of this invention have use as brominating agents, oxidizing agents and as reagents or intermediates for the preparation of other compounds, while those which have not been hitherto commercially available, increase the range of selection of brominating agents, oxidizing agents, intermediates and the like. The compounds N-bromoacetamide, N-bromosuccinimide and dibromodimethylhydantoin have been found particularly useful in the steroid field, as in the production of hormones and vitamins. An indication of these and other uses of N-bromoacetamide and N-bromosuccinimide may be found in the article by Djerassi, Chem. Rev. 43, 271, while additional indications of the uses of N-bromosuccinimide may be found in the booklet "N-bromosuccinimide—Its Reactions and Uses," by Thomas D. Waugh, copyright 1951. Thus, the compounds produced by the method of this invention should have numerous uses as brominating agents, as for introducing bromine into other compounds at an allylic position, the addition of bromine to a double bond or the addition of OH and Br to a double bond. Also, the difference in specificity of the reactions of N-bromosuccinimide and N-bromoacetamide, for instance, indicates that other compounds produced by the method of this invention may be better or particularly adapted for use in certain reactions, such as when solubility is important.

The novel compound dibromobiuret has exhibited completely unexpected and unique properties. Thus, N-bromosuccinimide has been found to react predominately by allylic substitution, as with cyclohexene in $CCl_4$ solution to produce 3-bromocyclohexene, but in $CCl_4$ solution gives no reaction with styrene, while N-bromoacetamide has been found to react predominately by addition, as with styrene, to produce styrene dibromide and with cyclohexene to produce predominately cyclohexenedibromide, each in $CCl_4$ solution. However, dibromobiuret has been found to react with cyclohexene to produce predominately the allylic substitution product and with styrene to produce the addition product, each in $CCl_4$ solution.

What is claimed is:

1. A method of producing an N-brominated organic compound from an N-organic compound selected from the group consisting of succinimide, glutarimide, phthalimide, lower alkyl succinimides, lower alkyl glutarimides, phenyl succinimide, phenyl glutarimide; monoamides having the formula $RCONH_2$, where R is selected from the group consisting of hydrogen, lower alkyl, cyclopentyl ethyl, carboxyethyl, phenyl, tolyl and benzyl; hydantoin, 5,5-di lower alkyl hydantoins, 5-phenyl hydantoin and 5,5-pentamethylene spirohydantoin; urea, biuret, oxamide, terephthalamide, succindiamide and adipamide, which comprises treating said N-hydrogen organic compound with bromine in an aqueous solution containing a bromate ion producing reagent and at a pH in the acid range.

2. A method according to claim 1, wherein the reaction is carried out in the presence of a catalytic amount of a chloride ion reagent.

3. A method according to claim 1, wherein the N-hydrogen organic compound is succinimide.

4. A method according to claim 1, wherein the N-hydrogen organic compound is acetamide.

5. A method according to claim 1, wherein the N-hydrogen organic compound is 5,5-dimethylhydantoin.

6. A method according to claim 1, wherein the N-hydrogen organic compound is biuret.

7. A method according to claim 1, wherein the N-hydrogen organic compound is oxamide.

8. A method according to claim 2, wherein the N-hydrogen compound is succinimide.

9. A method according to claim 2, wherein the N-hydrogen compound is acetamide.

10. Dibromobiuret produced in accordance with the method of claim 6.

References Cited in the file of this patent

UNITED STATES PATENTS

| 2,013,791 | Sachs et al. | Sept. 10, 1935 |
| 2,211,465 | Jewel et al. | Aug. 13, 1940 |
| 2,472,361 | Arsem | June 7, 1949 |

OTHER REFERENCES

Datta et al.: J. Am. Chem. Soc., vol. 37, p. 576 (1915).
Houben: Die Methoden der Organischen Chemie, vol. 3, p. 1146 (1943).
Chemical Abstracts, vol. 28 (1934), p. 1676.
Hofmann: Ber. Deut. Chem., vol. 15, pp. 752–761 (1882).